United States Patent [19]

Cane et al.

[11] 4,119,553

[45] Oct. 10, 1978

[54] PROCESS FOR THE PRODUCTION OF ESTERS IN THE PRESENCE OF A PYRIDINE BASE

[75] Inventors: Charles Cane; Bertram Yeomans, both of Hull, England

[73] Assignee: BP Chemicals Limited, London, England

[21] Appl. No.: 823,933

[22] Filed: Aug. 11, 1977

[30] Foreign Application Priority Data

Aug. 18, 1976 [GB] United Kingdom ............... 34391/76

[51] Int. Cl.$^2$ ...................... C07C 67/08; C10M 1/26; C08L 31/06
[52] U.S. Cl. ................. 560/198; 252/56 D; 526/22; 526/54
[58] Field of Search ................. 252/56 D; 560/198; 526/22, 54

[56] References Cited

U.S. PATENT DOCUMENTS

| | | | |
|---|---|---|---|
| 3,331,776 | 7/1967 | Krukziener | 252/56 D |
| 3,644,293 | 2/1972 | Fielder | 560/198 |
| 3,708,522 | 1/1973 | LeSuer | 560/198 |
| 3,784,573 | 1/1974 | Fields et al. | 560/198 |
| 3,957,709 | 5/1976 | Holzrichter et al. | 560/198 |

Primary Examiner—Delbert E. Gantz
Assistant Examiner—Joan Thierstein
Attorney, Agent, or Firm—Brooks, Haidt, Haffner & Delahunty

[57] ABSTRACT

Pentaerythritylmonopibsate esters having high hydroxyl: ester group ratios are prepared by an esterification reaction in the presence of a high-boiling pyridine base, of which collidine, 2-methyl-5-ethyl pyridine or quinoline are preferred.

18 Claims, No Drawings

PROCESS FOR THE PRODUCTION OF ESTERS IN THE PRESENCE OF A PYRIDINE BASE

The present invention relates to a process for the production of esters by reacting a polyhydric alcohol containing from 3 to 20 carbon atoms and at least 3 hydroxyl groups with polyisobutenyl succinic anhydride or acid. In particular the invention relates to a process for the production of polyisobutenyl succinic anhydride esters of pentaerythritol.

Esters of polyisobutenylsuccinic acid or anhydride, hereinafter referred to as PIBSA, with pentaerythritol, hereinafter referred to as PE, are used as oil-soluble dispersants in lubricating oils. It is believed that one of the best dispersants of this type is 'pentaerythrityl-monopibsate' esters, hereinafter referred to as PMP, which contain a high ratio of total hydroxyl groups, i.e. free + combined groups, to ester groups. The maximum ratio of total hydroxyl groups to ester groups obtainable by the esterification of PIBSA and PE is 8:2, viz in the compound of formula:-

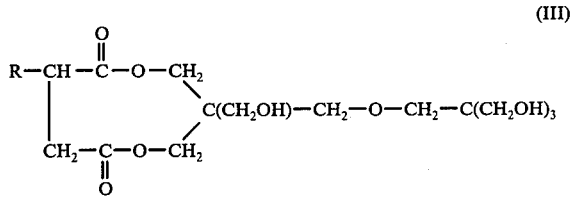

(I)

wherein R is the polyisobutenyl group. However, this ester is difficult to produce by a conventional esterification process and ester compositions are obtained which have low hydroxyl:ester group ratios because of the further esterification of combined PE moieties with the PIBSA. Conventionally esterification of PIBSA and PE is accomplished by heating the reaction mixture at a temperature in the range 150° to 200° C. in the absence of either an entrainer or a catalyst. The removal of water formed in the esterification reaction is facilitated either by vacuum stripping or by nitrogen sparging of the reaction mixture. However, under these conditions the esterification reaction is slow and requires from 10 to 11 hours for completion. Moreover the reaction products usually contain a mixture of esters in which the main component is thought to be monopentaerythrityl polyisobutenyl succinate of structural formula:

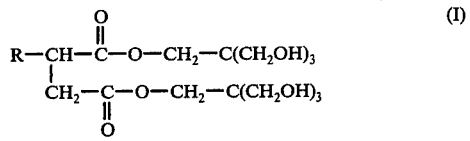

(II)

wherein R is the polyisobutenyl group. Esters of formula (II) have a total (free + combined) hydroxyl:ester group ratio of 4:2. Other components which may be present include polymer of the type:

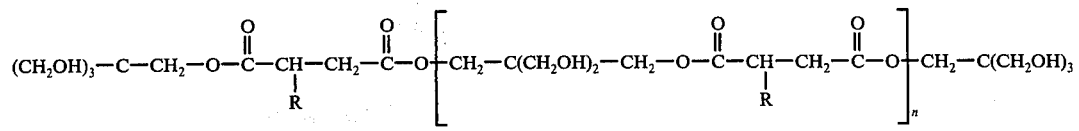

which have similarly low hydroxyl:ester group ratios, and esters derived from the dehydration products of PE, namely di-, tri-, tetra- and polypentaerythritol, which have correspondingly higher hydroxyl:ester group ratios. An example of the latter type of ester is mono-(dipentaerythrityl) polyisobutenylsuccinate of formula:

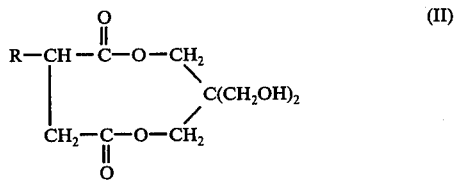

(III)

which has a total hydroxyl:ester group ratio of 6:2.

The conventional esterification of mixtures of PE and PIBSA necessary to produce PMP of high hydroxyl:ester group ratio invariably gives final ester product which is contaminated with unconverted, insoluble PE. The residual PE may be removed by filtration of the ester product, an operation which is generally only accomplished slowly and with difficulty. Usually products containing a high concentration of residual PE are more difficult to filter than are products containing a small amount of PE. Furthermore the conventional esterification procedure produces deposits of PE sublimate on the overhead parts of the esterification vessel resulting, on occasion, in blockage of the vapour exit lines. This sublimate is difficult to remove owing to its high melting point (262° C.) and its low solubility in conventional organic solvents.

It has now been found that PMP ester having a high hydroxyl (both free and combined): ester group ratio can be obtained by esterification of a PIBSA/PE mixture provided that sufficiently elevated temperatures are used. Operation at the necessary elevated temperature is made possible by including a high-boiling pyridine base in the esterification reaction mixture. The use of a pyridine base is effective in substantially overcoming the problems of conventional prior art processes. Thus, because such compounds are good solvents for PE, their use is effective in considerably reducing the build-up of sublimate in the overhead parts of the esterification unit. The pyridine base may also serve as an entrainer to remove the esterification reaction water overhead and additionally effectively prevents the dehydration of PE to di-, tri-, tetra- and polypentaerythritol.

Thus according to the present invention there is provided a process for the production of an ester of polyisobutenyl succinic acid or anhydride (PIBSA) with a polyhydric alcohol containing from 3 to 20 carbon atoms and at least 3 hydroxyl groups which process comprises reacting PIBSA with a polyhydric alcohol containing from 3 to 20 carbon atoms and at least 3 hydroxyl groups in the presence of a pyridine base under esterification reaction conditions. In order to facilitate its eventual removal from the ester product by distillation the pyridine base is preferably one having a boiling point of less than 250° C./1 bar. The pyridine base preferably also has a low solubility in water in order to permit efficient separation of condensed reaction water from the organic phase overhead. Preferably the pyridine base is collidine, 2-methyl-5-ethyl pyridine or quinoline. It is also possible to employ pyridine bases which boil at lower temperatures in the range 115 to 165° C./1 bar. Such pyridine bases include the lutidines, picolines and pyridine. However because of their high mutual solubility in water it is preferred to add pyridine bases boiling at temperatures in the range 115° to 165° C./1 bar in combination with a water-insoluble entrainer in order to provide the required separation of the reaction water phase from the condensate in an overhead decanter. A suitable water-insoluble entrainer is ortho-xylene.

The amount of pyridine base added may be in the range of from 1 to 95%, preferably from 5 to 30% w/w, based on the amount of alcohol and acid or anhydride thereof present.

It is also preferred to employ an esterification catalyst in the reaction in order to minimise the duration of the high temperature treatment. Conventional esterification catalysts may be used. Thus the catalyst may be a strong acid such as toluenepara-sulphonic acid, a strong base such as sodium hydroxide, or an amphoteric compound such as a tetraalkyltitanate e.g. tetraisopropyltitanate. Preferably the esterification catalyst is an alkaline earth metal oxide or hydroxide such as lime, magnesia or barium hydroxide.

In the event that the catalyst is a base, such as lime, the amount of the catalyst added may be in the range of from 0.01 to 10%, preferably from 0.05 to 0.5% w/w based on the total weight of the esterification reaction mixture.

PIBSA may be formed by the reaction of polyisobutene or halogen-substituted polyisobutene with maleic anhydride in a manner, and under conditions, which are conventional in the art. Preferably the polybutene or halogen-substituted derivative thereof has a number average molecular weight in the range 300 to 3,000.

Preferably the polyhydric alcohol containing from 3 to 20 carbon atoms and at least 3 hydroxyl groups is pentaerythritol (PE). Alcohols which may be used include dipentaerythritol.

It is preferred to employ the polyhydric alcohol in an amount in excess of the stoichiometric quantity required for esterification of the PIBSA. However when the polyhydric alcohol is PE in order to avoid any difficulty in filtering the final product it is preferred to keep the excess of PE to a minimum. Of course the amount of polyhydric alcohol added will depend on the ratio of hydroxyl to ester groups required in the final product, the maximum value of this ratio being 8:2. Thus up to 100% molar excess of the amount of polyhydric alcohol required to produce a product having a hydroxyl:ester group ratio of 8:2 may be employed, though a 5 to 25% molar excess is preferred. The process of the invention is particularly advantageous for the production of PIBSA esters of polyhydric alcohols having a hydroxyl:ester group ratio from 6 to 8:2.

Turning now to the esterification reaction conditions the temperature may suitably be in the range 190° to 250°, preferably from 220° to 235° C. However when a high concentration of a pyridine base having a boiling-point, at atmospheric pressure, below these temperature ranges is used it may be necessary to increase the reaction pressure above the reactants in order to achieve boiling of the reaction mixture within the specified temperature range. An advantage of operating at superatmospheric pressure when using PE is that the partial pressure of the PE in the reaction mixture is lowered, thereby reducing its sublimation rate.

When the esterification of PIBSA and the polyhydric alcohol is complete the pyridine base may be removed from the crude ester product by vacuum stripping at temperatures up to 200° C. Preferably this removal is accomplished by heating the crude ester product to a temperature in the range 140° to 160° C. at a pressure in the range 20 to 100 mbar, using a nitrogen sparge to facilitate the removal of the pyridine base overhead. Any unconverted polyhydric alcohol may be removed from the final ester product by filtration.

According to another aspect of the present invention there is provided a lubricant composition comprising a lubricant base oil and an ester of PIBSA and a polyhydric alcohol containing from 3 to 20 carbon atoms and at least 3 hydroxyl groups as hereinbefore described.

Normally the lubricant composition as ultimately used will contain a major proportion of the lubricant base oil and only a minor proportion of the ester but the composition may be manufactured and supplied as a concentrate in which the ester comprises the major component before final dilution with lubricating oil by the customer.

The lubricant composition may contain, in addition to the esters prepared according to the present invention, any of the additives commonly incorporated in such compositions e.g. VI improvers, rust inhibitors, antioxidants, corrosion inhibitors etc.

The invention will now be illustrated by reference to the following examples.

EXAMPLE 1

7.34 kg. polyisobutenyl succinic anhydride (prepared from polyisobutene of mean molecular weight ca. 1,000 and having a PIBSA number of 65.8 mg KOH equiv/g), 1.23 kg. pentaerythritol, 0.58 kg 2-methyl-5-ethylpyridine entrainer and 9.5 g lime esterification catalyst were heated under reflux (ca. 230° C./1 bar) with stirring in a round-bottom flask (10l) which was connected to a decanter. The progress of the esterification was followed by monitoring both the acidity of the esterification mixture and the amount of water collected in the decanter.

A conversion of PIBSA to PMP ester of 99.2% (based on residual acidity) and 101% (based on water removal) was achieved after an esterification time of 5.5 hours. The esterifier was virtually free from PE sublimate at the end of the esterification.

The pyridine base was removed from the PMP ester by vacuum stripping at ca. 150° C./27 mbar under nitrogen sparging for 3 hours. Unconverted PE was removed from the stripped PMP ester product by filtration.

The final PMP product had a high hydroxyl (free + combined) to ester group ratio of 7:2 (as determined by infra-red spectroscopic analysis), as required for the oil-soluble dispersant applications.

EXAMPLE 2

Example 1 was repeated except that the addition of the lime esterification catalyst was omitted. The reaction conditions and the hydroxyl:ester group ratio of the product is given in the Table.

Comparison Test A

Example 1 was repeated except that methyl isobutyl ketone was added as entrainer in place of 2-methyl-5-ethylpyridine and the lime esterification catalyst was omitted. The reaction conditions and the hydroxyl:ester group ratio of the product is given in the Table.

This is not an example according to the invention and is included for comparison purposes only.

Comparison Test B

Example 1 was repeated except that ortho-xylene was added as entrainer in place of 2-methyl-5-ethylpyridine and the lime esterification catalyst was omitted. The reaction conditions and the hydroxyl-ester group ratio of the product are given in the Table. This is not an example according to the invention and is included for comparison purposes only.

Copious deposits of PE sublimate occurred on the upper parts of the esterification vessel in Comparison Tests A and B when methyl isobutyl ketone and ortho-xylene respectively were used as entrainers and any further increase in the reaction temperature (to increase the hydroxyl:ester group ratio) was rendered impractical. An above-theoretical production of water was also otained in Comparison Tests A and B, presumably due to "esterification" of the PE. This high loss of PE was avoided completely in Example 2 by the use of the pyridine base as entrainer.

A comparison of the results obtained for Examples 1 and 2 demonstrates that lime is an effective catalyst for increasing the rate of production of PMP esters.

EXAMPLE 3

2.4 kg of polyisobutenyl succinic anhydride (PIBSA number 65.8 mg KOH equiv./g), 0.36 kg of dipentaerythritol, 0.36 kg of 2-methyl-5-ethyl pyridine entrainer, 0.28 kg of lube oil and 4.6 g of lime were heated under reflux (ca. 230° C./1 bar) with stirring in a round-bottom flask (5 liter), which was connected to a decanter.

A conversion of PIBSA to PMP ester of 98.1% (based on residual acidity) was achieved after an esterification time of 6 hours. The pyridine base was removed from the PMP ester by vacuum-stripping at ca. 150° C./30 mbar (under nitrogen sparging) for 3 hours. Traces of unconverted dipentaerythritol were removed from the stripped PMP products by filtration.

The final PMP product had a high hydroxyl (free + combined) to ester group ratio of 6:2, as required for oil-soluble dispersant applications.

TABLE

| Example No. | Esterification Mixture Composition Molar Ratio | | | Esterification Conditions | | Conversion of PIBSA to PMP ester (%) based on: | | Final PMP Ester Product Total Hydroxyl:Ester Group Ratio |
|---|---|---|---|---|---|---|---|---|
| | PE Hydroxyl Groups, as charged | PIBSA Acid Groups | Entrainer | Temp. (° C.) | Duration (h) | $H_2O$ Produced | Residual Acidity | |
| 2 | 11.9 | 2 | 2-Me-5-Et pyridine (6.3%w/w) | 230 | 12 | 93 | 97.5 | 7.8:2 |
| Comparison Test A | 8.8 | 2 | Methylisobutyl ketone (5.6%w/w) | 180–208 | 7 | 146 | 98.6 | 5.5:2 |
| Comparison Test B | 7.6 | 2 | o-xylene (0.1%w/w) | 188 | 12 | 131 | 97.7 | 4.5:2 |

We claim:

1. A process for the production of polyisobutenyl succinic acid or anhydride (PIBSA) esters of polyhydric alcohols containing from 3 to 20 carbon atoms and at least 3 hydroxyl groups which comprises reacting PIBSA with at least a stoichiometric amount of a polyhydric alcohol containing from 3 to 20 carbon atoms and at least 3 hydroxyl groups at a temperature in the range of from about 190° to 250° C. in the presence of a pyridine base selected from the group consisting of collidine, 2-methyl-5-ethyl pyridine, and quinoline so that the ester reaction product obtained has an hydroxyl group to ester group ratio in the range of from about 6 to 8.2.

2. A process according to claim 1 wherein the amount of pyridine base present is in the range of from 1 to 95% w/w based on the amount of polyhydric alcohol and PIBSA present.

3. A process according to claim 2 wherein the amount of pyridine base present is in the range of from 5 to 30% w/w.

4. A process according to claim 1 wherein the reaction is carried out in the presence of an esterification catalyst.

5. A process according to claim 4 wherein the esterification catalyst is an alkaline earth metal oxide or hydroxide.

6. A process according to claim 5 wherein the alkaline earth metal oxide or hydroxide is lime, magnesia or barium hydroxide 7. A process according to claim 1 wherein the amount of the catalyst present is in the range of from 0.01 to 10% w/w based on the total weight of the esterification reaction mixture.

8. A process according to claim 7 wherein the amount of catalyst is in the range from 0.05 to 0.5% w/w.

9. A process according to claim 1 wherein the polyisobutene or halogen-substituted polyisobutene reacted with maleic anhydride to form PIBSA has a number average molecular weight in the range 300 to 3,000.

10. A process according to claim 1 wherein the polyhydric alcohol is pentaerythritol (PE).

11. A process according to claim 1 wherein up to 100% molar excess of the amount of polyhydric alcohol required to produce an ester product having a total (free + combined) hydroxyl:ester group ratio of 8:2 is employed.

12. A process according to claim 11 wherein the molar excess of polyhydric alcohol is in the range 5 to 25%.

13. A process according to claim 1 wherein the esterification reaction temperature is in the range 190° to 250° C.

14. A process according to claim 13 wherein the reaction temperature is in the range 220° to 235° C.

15. A process according to claim 1 wherein the reaction pressure is superatmospheric.

16. A process according to claim 1 wherein upon completion of the esterification reaction the pyridine base is removed from the crude ester product by vacuum stripping at temperatures up to 200° C.

17. A process according to claim 16 wherein removal of the pyridine base is accomplished by heating the crude ester product to a temperature in the range 140° to 160° C. at a pressure in the range 20 to 100 mbar, using a nitrogen sparge.

18. A process according to claim 1 wherein any unconverted polyhydric alcohol is removed from the crude ester product by filtration.

* * * * *